(No Model.) 2 Sheets—Sheet 1.

E. DREDGE.
CAR BRAKE AND STARTER.

No. 423,225. Patented Mar. 11, 1890.

Witnesses:—

Inventor:
Edgar Dredge
by attorneys (No Model.) 2 Sheets—Sheet 2.
E. DREDGE.
CAR BRAKE AND STARTER.
No. 423,225. Patented Mar. 11, 1890.
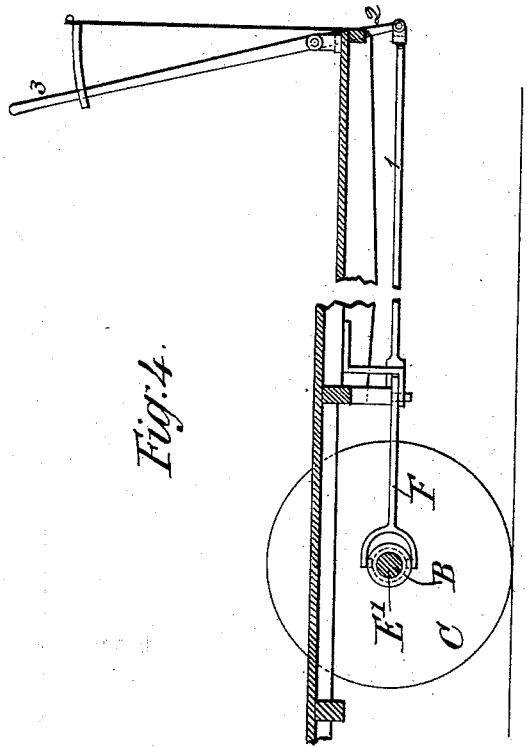
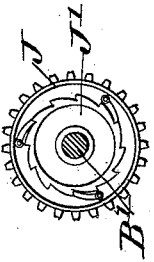
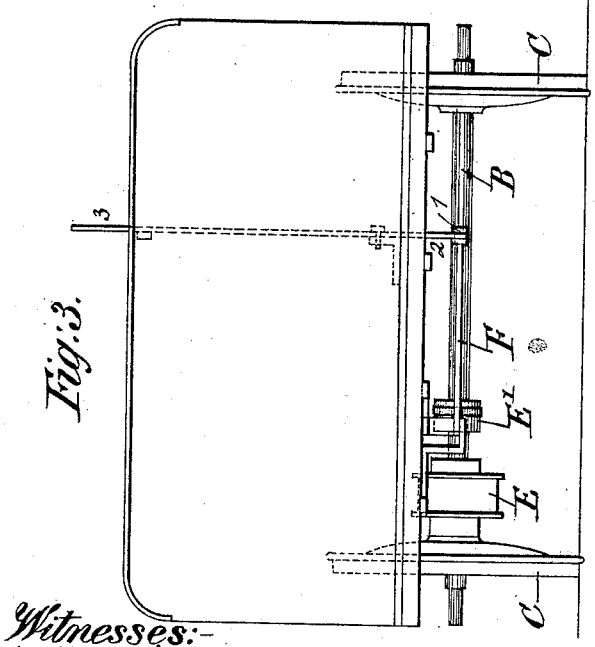
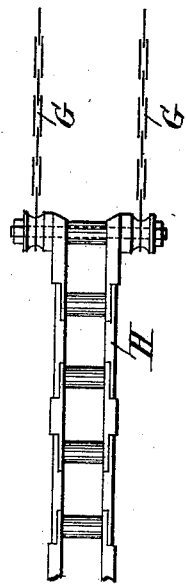
Witnesses:—
Inventor:—
Edgar Dredge
by attorneys

UNITED STATES PATENT OFFICE.

EDGAR DREDGE, OF STOKE NEWINGTON, COUNTY OF MIDDLESEX, ENGLAND.

CAR BRAKE AND STARTER.

SPECIFICATION forming part of Letters Patent No. 423,225, dated March 11, 1890.

Application filed December 3, 1889. Serial No. 332,381. (No model.)

*To all whom it may concern:*

Be it known that I, EDGAR DREDGE, of Rose Bank, Park Villas, Albion Road, Stoke Newington, in the county of Middlesex, England, have invented certain new and useful Improvements in Apparatus for Stopping and Starting Tram-Cars and Similar Conveyances, of which the following is a specification.

The object of this invention is to provide apparatus for stopping tram-cars and similar conveyances and for restarting them by the power (from whatever source derived) stored up during the stopping of the vehicle.

In most apparatus of this character springs of all kinds, as well as various other mechanical devices, have been suggested as the motive power for starting the car, and I therefore adopt in carrying out my invention any of the well-known means for storing up the power.

Now my invention consists in a simple arrangement of apparatus for starting the car and in the combination therewith of brake mechanism, whereby the powerful influence of the impetus on the car is brought to bear on the brakes, and the stopping of the car is caused automatically, effectually, and promptly at whatever speed the car may be progressing.

Figure 1:
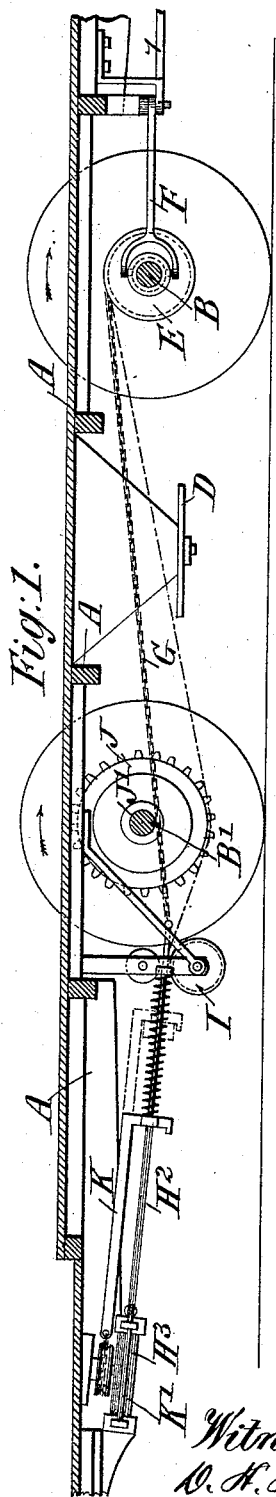
Figure 2:
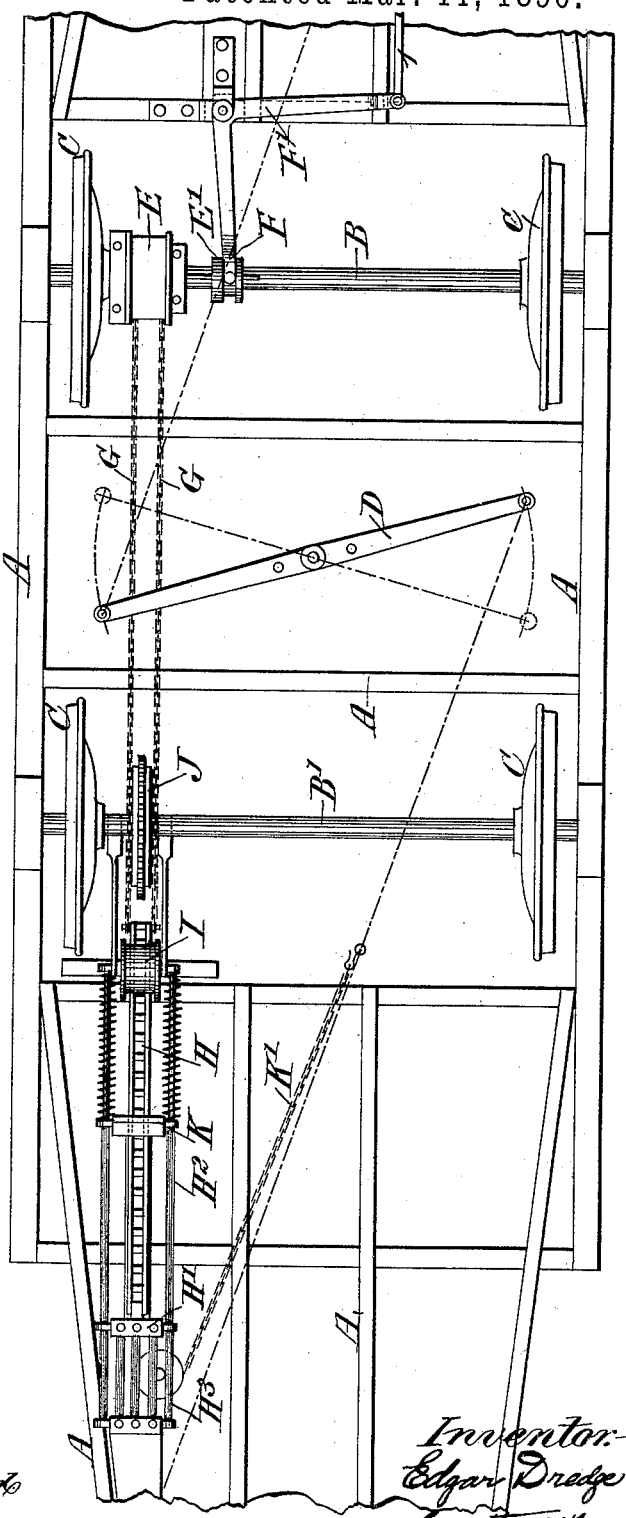

In the accompanying drawings, Figure 1 is a longitudinal section of a tram-car with my apparatus adapted thereto. Fig. 2 is an under side plan view. Fig. 3 is a front view of so much of a tram-car as is necessary to show my invention. Fig. 4 is a partial longitudinal section; and Figs. 5 and 6 show details, which will be more particularly referred to hereinafter.

A is the frame of the car.

B B' are the axles of the running wheels C, and D is a brake-lever of the ordinary construction, and which may be actuated by the driver in the usual manner when desired.

E is a drum mounted loosely on the axle B and forming one part of a friction-clutch of any convenient construction, and E' is the other part of the clutch, which slides on the axle B on a feather. The part E' is thrown into gear with the part E by means of the fork F on one arm of a bell-crank lever F', which is actuated through the connecting-rod 1 and lever 2, the handle 3 of which works in a guide secured to the front rail of the car-platform and within reach of the driver, or in any other convenient manner.

Attached to the drum E are a pair of chains G, which extend beyond the axle B', and are secured to a cross-head or bolt forming one end of an open-link chain H. (See the detached view, Fig. 5.) The other end of this chain is secured to a second cross-head H', which may slide on guide-rods H², and is attached to a spring or springs H³, secured to the frame A of the vehicle. The open-link chain H passes between guide-pulleys I, suitably arranged to maintain the chain in its proper position.

Upon the axle B', between the chains G, is mounted a pawl-and-ratchet coupling J J', (shown detached at Fig. 6,) or it may be a silent clutch of any well-known kind and having round its outer periphery gear-teeth. This coupling consists of a flanged disk-wheel J, mounted loosely on the axle B', having round its outer periphery gear-teeth and carrying inside one or more pawls.

J' is a second flanged wheel keyed on the axle B' within the wheel J, and having on its outer periphery ratchet-teeth with which the pawls of the wheel J engage. It will thus be seen that the part J will be free to rotate on the axle B' in one direction only.

The driver when desiring to stop the car throws the clutch E E' into gear and causes the drum to wind up the chains G under the influence of the momentum of the car. The link chain H is thus drawn out and the springs H³ distended. As the chain H comes into contact with the teeth of the wheel J this wheel will be rotated in the direction opposite to that in which the car is proceeding, and the chain will assume the position shown by the dotted line, Fig. 1. The chain when extended will be, so to speak, in equilibrium, as the friction-clutch E E' may be said to be pulling one way, while the tendency of the silent or pawl clutch J J' is to pull the other way. The pawl or silent wheel J in fact acts as a pawl to the drum E of the friction-clutch E E' when winding up, so that so long as the friction-clutch is in gear there can be no running back of the chain H under the influence of the springs.

To start the car, the driver releases the clutch E E' and the springs will pull back the chain H. This will cause the wheel J, with which the chain is in gear, to rotate in the direction in which the car is to proceed, and by reason of the pawl-and-ratchet arrangement it will also drive the axle B' in the same direction, and thus start the car. As the chain H is pulled out during the stopping of the car the cross-head H' will strike against and push forward another cross-head K, which may also slide on the guide-rods $H^2$, and is attached by a chain K' (which passes round a guide-pulley) to the chain of the ordinary brake-lever D. Thus it will be seen that the act of storing the power during the stopping of the car will also put on the brakes, and as the power is produced by the impetus of the car the action of the brakes will be more powerful than when worked by the driver. The brake-blocks and connections are not shown in the drawings, as they are of the well-known type and form no part of the present invention.

It is necessary for the starting of the car that the brakes should be "off" immediately when the clutch E is released. To effect this object, I may place upon the guide-rods $H^2$, outside the cross-head K, springs $K^2$, which will be compressed as the brakes are put on, but will drive back the cross-head the moment the clutch E is released, and so release the brake-blocks.

The springs $H^3$ shown in the drawings are india-rubber springs; but any other springs or any other source of power may be used without departing from my invention.

It will also be evident that the apparatus will be duplicated and reversed, so that one or other may be used, according to the direction in which the car is proceeding.

Having now particularly described and ascertained the nature of my said invention and in what manner the same is to be performed, I declare that what I claim is—

In a car-starting apparatus, the combination, with means for storing up power, as $H^3$, of a friction-clutch E E', mounted on an axle of the running wheels for producing the power, an open-link chain H for conveying the stored power, means J J' for receiving the stored power and communicating the same to an axle of the running wheels, and means, as K K', for actuating the brake-lever D, substantially as specified.

EDGAR DREDGE.

Witnesses:
H. K. WHITE,
H. W. SPACKMAN.